US012675868B2

(12) United States Patent
Jegou

(10) Patent No.: US 12,675,868 B2
(45) Date of Patent: Jul. 7, 2026

(54) DETECTION OF LIQUID

(71) Applicant: SMITHS DETECTION FRANCE S.A.S., Vitry-sur-Seine (FR)

(72) Inventor: Guillaume Jegou, Vitry-sur-Seine (FR)

(73) Assignee: SMITHS DETECTION FRANCE S.A.S., Vitry-sur-Seine (FR)

( * ) Notice: Subject to any disclaimer, the term of this patent is extended or adjusted under 35 U.S.C. 154(b) by 655 days.

(21) Appl. No.: 17/998,706

(22) PCT Filed: May 12, 2021

(86) PCT No.: PCT/GB2021/051135
§ 371 (c)(1),
(2) Date: Nov. 14, 2022

(87) PCT Pub. No.: WO2021/229219
PCT Pub. Date: Nov. 18, 2021

(65) Prior Publication Data
US 2023/0334639 A1 Oct. 19, 2023

(30) Foreign Application Priority Data
May 15, 2020 (GB) ...................................... 2007189

(51) Int. Cl.
*G06T 7/00* (2017.01)
*G01F 22/00* (2006.01)
(Continued)

(52) U.S. Cl.
CPC .......... *G06T 7/0008* (2013.01); *G01F 23/288* (2013.01); *G06T 7/0002* (2013.01);
(Continued)

(58) Field of Classification Search
CPC ....... G06T 7/0008; G06T 7/0002; G06T 7/70; G06T 2207/10116; G06T 2207/30108;
(Continued)

(56) References Cited

U.S. PATENT DOCUMENTS 6,553,094 B1 * 4/2003 Bernardi .............. G01N 23/046
378/57
10,650,204 B2 * 5/2020 Chen ......................... G06T 7/13
(Continued)

FOREIGN PATENT DOCUMENTS

CN 102608135 A 7/2012
CN 108647597 A 10/2018
(Continued)

OTHER PUBLICATIONS

PCT International Search Report and Written Opinion, Application No. PCT/GB2021/051135, dated Jul. 30, 2021, 12 pages.
UK Search Report, Application No. GB2007189.0, dated Oct. 27, 2020, 3 pps.

*Primary Examiner* — Amandeep Saini
*Assistant Examiner* — Andrew S Budisalich
(74) *Attorney, Agent, or Firm* — Armstrong Teasdale LLP

(57) ABSTRACT

A method for detecting zones corresponding to a surface of liquid cargo the method including obtaining inspection data associated with pixels of zones of interest in the inspection image of the cargo which is tilted, the pixels having signal levels, determining a vertical derivative field from the obtained inspection data, determining a horizontal derivative field from the obtained inspection data, and determining, based on the determined vertical derivative field and on the determined horizontal derivative field, zones where a first order vertical derivative is positive, and an absolute value of the first order horizontal derivative is smaller than a predetermined threshold.

13 Claims, 4 Drawing Sheets

(51) Int. Cl.
    *G01F 23/288*     (2006.01)
    *G01F 23/80*     (2022.01)
    *G06T 7/70*     (2017.01)
    *G06V 10/44*     (2022.01)
    *G06V 20/52*     (2022.01)

(52) U.S. Cl.
    CPC ................ *G06T 7/70* (2017.01); *G06V 10/44*
    (2022.01); *G06V 20/52* (2022.01); *G06T*
    *2207/10116* (2013.01)

(58) Field of Classification Search
    CPC ... G06T 7/13; G06T 7/62; G06T 2207/30112;
    G01F 23/288; G01F 22/00; G01F 23/80;
    G06V 10/44; G06V 20/52; G01N 23/083;
    G01N 23/10; G01N 23/12; G01V 5/22
    See application file for complete search history.

(56) References Cited

U.S. PATENT DOCUMENTS

| | | | |
|---|---|---|---|
| 2011/0317004 A1* | 12/2011 | Tao ..................... | A61M 5/1684 |
| | | | 235/494 |
| 2016/0238543 A1* | 8/2016 | Powell .................. | G01N 23/10 |
| 2019/0332858 A1 | 10/2019 | Song | |
| 2021/0358132 A1* | 11/2021 | Liu .......................... | G06T 5/70 |

FOREIGN PATENT DOCUMENTS

| | | | |
|---|---|---|---|
| GB | 2550078 A | | 11/2017 |
| JP | 2017090248 A | * | 5/2017 |
| WO | 9402839 A1 | | 2/1994 |
| WO | 2010025539 A1 | | 3/2010 |

* cited by examiner

DETECTION OF LIQUID

CROSS-REFERENCE TO RELATED APPLICATIONS

This application is a national stage application of PCT/GB2021/051135 filed on May 12, 2021, which claims priority to GB Application No. 2007189.0 filed on May 15, 2020, the disclosures of which are hereby incorporated by reference herein in their entirety as part of the present application.

FIELD OF DISCLOSURE

The disclosure relates but is not limited to a method for detecting liquid cargo in an inspection image of inspected cargo. The disclosure also relates but is not limited to an analyser which can perform such a method.

BACKGROUND OF DISCLOSURE

Inspection of cargo may involve scanning the cargo using penetrating radiation transmitted through the cargo (such as X-ray), and generating inspection data associated with signal levels of pixels of the inspection image of the inspected cargo.

Cargo may contain e.g. contraband goods and/or dangerous goods which are liquids (such explosives, drug precursor, alcohol, mineral oils, and general chemical products as non-limiting examples).

It may be difficult and/or inefficient to detect liquids in the cargo using the inspection image.

SUMMARY

Aspects and embodiments of the disclosure are set out in the appended claims. These and other aspects and embodiments of the disclosure are also described herein.

BRIEF DESCRIPTION OF DRAWINGS

Embodiments of the present disclosure will now be described, by way of example, with reference to the accompanying drawings, in which:

FIG. 7 schematically illustrates an additional tilting orientation compared to the tilting orientation illustrated in FIG. 2; and.

In the figures, similar elements bear identical numerical references.

DETAILED DESCRIPTION

Overview

The disclosure relates, in some examples, to a method for detecting surfaces of liquid cargo in an inspection image. The cargo to be inspected is tilted with respect to a first horizontal direction and is inspected with a scan along a second, perpendicular horizontal direction. In the inspection image generated using the scan, the surfaces of the liquid cargo appear substantially parallel to the second horizontal direction, as surfaces of liquids remain horizontal regardless of the tilt. The surfaces of the liquid cargo may thus be detected in the inspection image.

Embodiments of the disclosure may enable automatic detection of liquids in the cargo. Embodiments of the disclosure may enable more efficient detection of liquids in the cargo.

Detailed Description of Example Embodiments

Figures 1, 2:
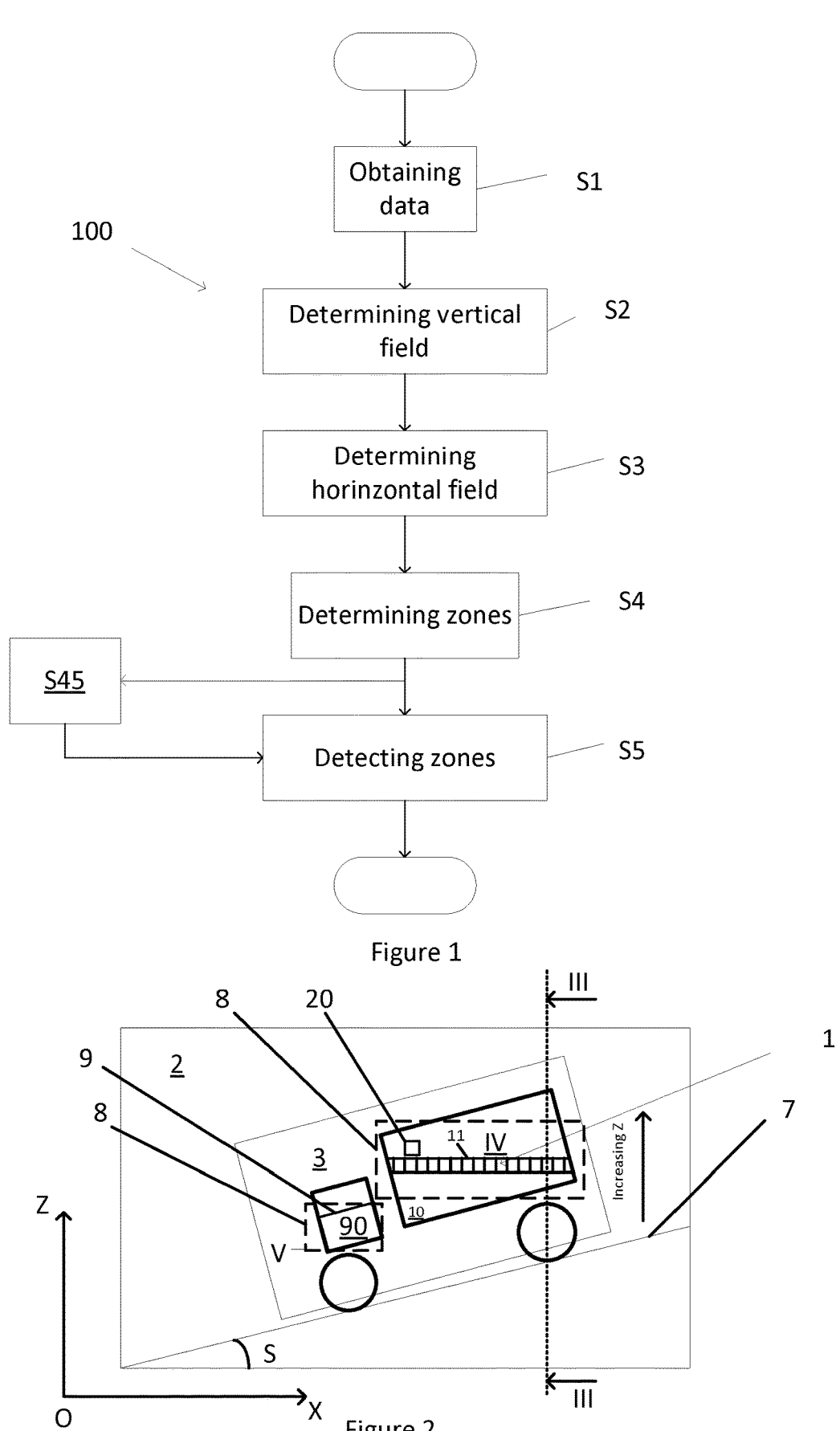
FIG. 1 schematically illustrates an example method for detecting zones corresponding to a surface of liquid cargo in an inspection image of inspected cargo.
FIG. 2 schematically illustrates example zones corresponding to a surface of liquid cargo in an inspection image of inspected cargo.

FIG. 1 schematically illustrates an example method 100 for detecting zones corresponding to a surface of liquid cargo in an inspection image of inspected cargo. FIG. 2 schematically illustrates an example zone 1 corresponding to the surface 11 of the liquid cargo 10 in an inspection image 2 of the inspected cargo 3.

Referring back to FIG. 1, the method 100 may include:

obtaining, at S1, inspection data associated with pixels of zones of interest in the inspection image;

determining, at S2, a vertical derivative field from the obtained inspection data;

determining, at S3, a horizontal derivative field from the obtained inspection data;

determining, at S4, specific zones based on the determined vertical derivative field and on the determined horizontal derivative field; and detecting zones, at S5, corresponding to the surface of the liquid cargo based at least on the specific zones determined at S4.

Figure 3:
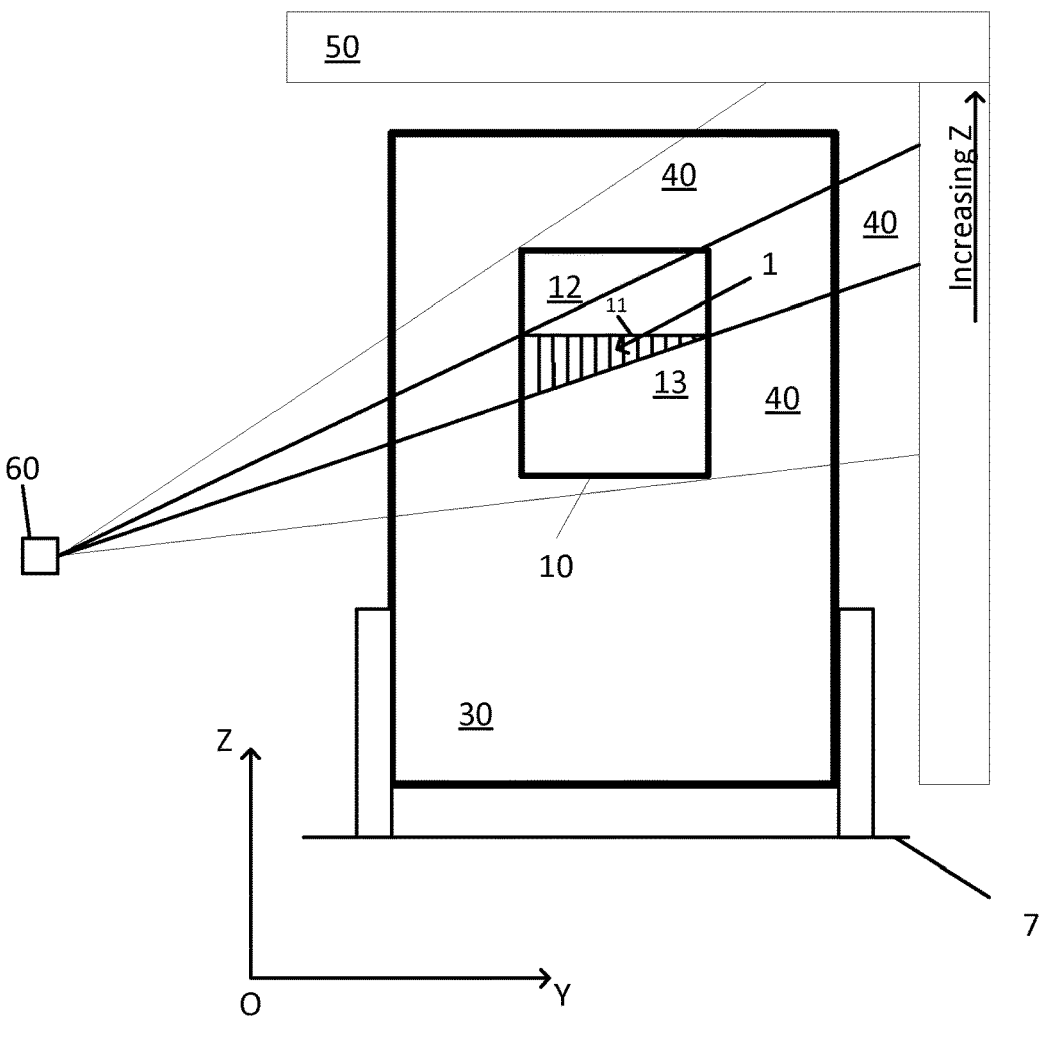
FIG. 3 schematically illustrates an example inspection of cargo using penetrating radiation transmitted through the cargo, corresponding to a view of a cross-section along line III-III of FIG. 2.

As illustrated in FIG. 3, the inspection image 2 of FIG. 2 may be generated from inspection of cargo 30 using penetrating radiation 40 (such as X-rays as a non-limiting example) transmitted through the cargo 30. The penetrating radiation 40 may be emitted from a radiation source 60 and detected by the detectors 50. The detectors 50 may thus generate inspection data to generate the inspection image 2.

As best shown in FIG. 2, the inspection of the cargo 30 includes tilting the cargo 30 around a first horizontal direction (e.g. a first horizontal rotation axis) perpendicular to a vertical direction corresponding to a direction of gravity. The first horizontal direction is substantially parallel to direction (OY) in FIGS. 2 and 3. The vertical direction of gravity is substantially parallel to direction (OZ) in FIGS. 2 and 3.

As best shown in FIG. 2, the tilting of the cargo 30 around the first horizontal direction may be with a slope S with respect to a second horizontal direction. The second horizontal direction is substantially parallel to direction (OX) in FIGS. 2 and 3.

As best shown in FIG. 2, the tilting of the cargo 30 around the first horizontal direction perpendicular to the vertical direction of gravity may be performed by tilting a floor 7 on which the cargo 30 is located and/or is moving. The floor 7 may be permanently tilted or tilted as necessary for the scan.

As best shown in FIG. 2, the inspection of the cargo 30 also includes scanning the tilted cargo 30 in the second horizontal direction (e.g. the direction substantially parallel to the direction (OX)), perpendicular to the first horizontal direction (e.g. the direction substantially parallel to the direction (OY)).

As illustrated in FIG. 2, surfaces of liquids remain horizontal regardless of the tilt, and in the inspection image 2 generated using the inspection data, the surface 11 of the liquid cargo 10 appears substantially parallel to the second horizontal direction (e.g. the direction substantially parallel to the direction (OX)). On the contrary, in the inspection image 2 generated using the inspection data, a surface 9 of solid cargo 90 is not parallel to the second horizontal direction (e.g. the direction substantially parallel to the direction (OX)), because surfaces of solid cargo are tilted as the cargo 30 is tilted.

The surface 11 of the liquid cargo 10 may thus be detected in the inspection image 2, e.g. as disclosed below in more detail.

As illustrated in FIG. 2, the inspection data is associated with pixels 20 of zones 8 of interest in the inspection image 2. The pixels 20 have signal levels. As best shown in FIG. 3, when the penetrating radiation 40 is not transmitted through the cargo 30 (e.g. the penetrating radiation 40 is substantially blocked by the cargo 30), the penetrating radiation 40 is not detected by the detectors 50 and the signal levels of the associated pixels 20 in the inspection image 2 are substantially null.

As best shown in FIG. 3, when the penetrating radiation 40 is fully transmitted to the detectors 50 (e.g. the cargo 30 is substantially transparent to the penetrating radiation 40), the signal levels of the associated pixels 20 in the inspection image 2 are at maximum levels.

As best shown in FIG. 3, the signal levels of the associated pixels 20 in the inspection image 2 corresponding to the penetrating radiation 40 which is not substantially blocked by the cargo 30 or not substantially fully transmitted to the detectors 50 have signal levels between the two extreme limits described above.

As illustrated in FIG. 2, in some examples the zones 8 of interest may correspond to zones which are smaller than the whole inspection image 2. The zones 8 of interest may be selected automatically or manually by an operator of an inspection system for inspecting the cargo 30, based e.g. on a suspicion that the zones 8 may include liquid cargo. In the example of FIG. 2, two zones 8 of interest are selected, with only one zone 8 including the liquid cargo 10, the other zone 8 including the solid cargo 90. Other numbers of zones 8 may be selected. In some examples the zones 8 may correspond to the whole of the inspection image 2.

Referring back to FIG. 1, determining, at S2, the vertical derivative field from the inspection data obtained at S1 may include determining a first order vertical derivative of the signal levels in each pixel 20 of the zones 8 of interest. In some examples the first order vertical derivative is determined from a lower vertical location in the zones 8 of interest to an upper vertical location in the zones 8 of interest. In the example illustrated in FIGS. 2 and 3, the first order vertical derivatives are determined from a smaller value on the axis (OZ) to a greater value on the axis (OZ), in the zones 8 of interest.

Figure 4:
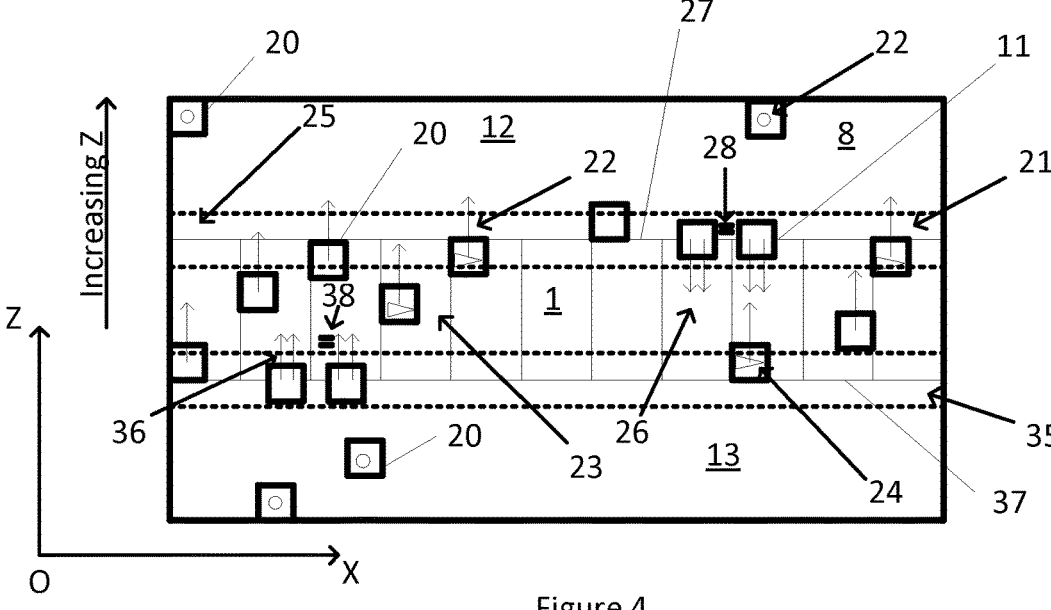
FIG. 4 schematically illustrates an example vertical derivative field determined from the obtained inspection data in a first zone of interest, corresponding to a view of a zone IV of FIG. 2.

FIG. 4 (corresponding to a zone IV of FIG. 2) schematically illustrates an example vertical derivative field 21 determined at S2 from the inspection data obtained at S1. The vertical derivative field 21 of FIG. 4 includes the first order vertical derivative 22 of the signal levels in each pixel 20 of the zone 8 of interest. In FIG. 4, the first order vertical derivatives 22 are determined from a lower vertical location in the zone 8 of interest to an upper vertical location in the zone 8 of interest (e.g. increasing Z on the (OZ) axis).

Referring back to FIG. 1, determining, at S3, the horizontal derivative field from the inspection data obtained at S1 may include determining a first order horizontal derivative of the signal levels in each pixel 20 of the zones 8 of interest. In the example illustrated in FIG. 2, the first order vertical derivatives may be determined along the axis (OX) in the zones 8 of interest, regardless of the value increasing or decreasing direction.

Figures 5, 6:
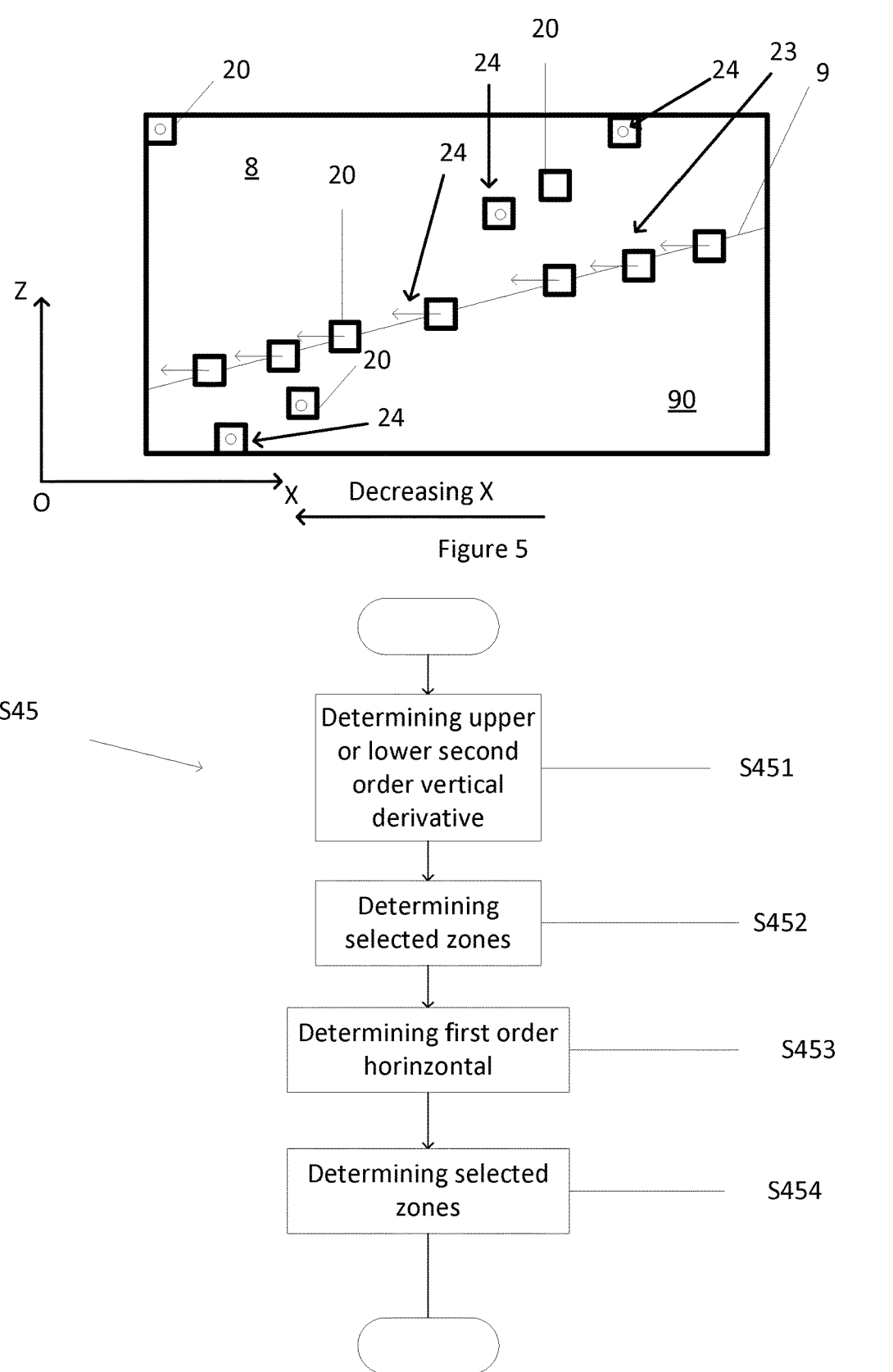
FIG. 5 schematically illustrates an example horizontal derivative field determined from the obtained inspection data in a second zone of interest, corresponding to a view of a zone V of FIG. 2.
FIG. 6 schematically illustrates an example optional step in the method of FIG. 1.

FIG. 5 (corresponding to a zone V of FIG. 2) schematically illustrates an example horizontal derivative field 23 determined at S2 from the inspection data obtained at S1. The horizontal derivative field 23 of FIG. 5 includes the first order horizontal derivative 24 of the signal levels in each pixel 20 of the zone 8 of interest. In FIG. 4, the first order horizontal derivatives 24 are determined along a horizontal direction in the zone 8 of interest (e.g. decreasing X on the (OX) axis—although increasing X could also be envisaged as only the absolute value of the horizontal derivatives 24 is of interest).

Referring back to FIG. 1, determining, at S4, the specific zones may include determining zones 1 where the first order vertical derivative 22 is positive, and the absolute value of the first order horizontal derivative 24 is smaller than a predetermined threshold. The predetermined threshold may depend on a quality of the inspection system (and statistical fluctuations associated with the inspection system). Alternatively or additionally, the predetermined threshold may depend on a thickness of the liquid cargo 10. Alternatively or additionally, the predetermined threshold may depend on a vertical location of the liquid cargo 10 in the cargo 30. The predetermined threshold may be selected by a deviser of the inspection system or by the operator of the inspection system for inspecting the cargo 30.

As illustrated in FIGS. 3 and 4, the first order vertical derivatives 22 which are positive (as illustrated by the upwards arrows in FIG. 4) are associated with an amount of liquid 10 crossed by the inspection radiation 40 decreasing from the lower vertical location to the upper vertical location (increasing Z along on the axis (OZ)), in the detected zone 1, at the surface 11 of the liquid cargo 10. In the example of FIGS. 2 and 3, the signal levels of the pixels 20 increase as Z increases in the zone 1, and the first order vertical derivatives 22 are positive.

In some examples the first order vertical derivatives 22 which are positive may be greater than a predetermined positive threshold. The predetermined positive threshold may be selected by the deviser of the inspection system or by the operator of the inspection system for inspecting the cargo 30.

As illustrated in FIGS. 3 and 4, first order vertical derivatives 22 which are substantially null (as illustrated by the small circles in FIG. 4) are associated with an amount of liquid 10 or air crossed by the inspection radiation 40 which is substantially constant from the lower vertical location to the upper vertical location (increasing Z along on the axis (OZ)).

For example, under the surface 11, in a zone 13, the penetrating radiation 40 is transmitted through the liquid cargo 10 only, and the signal levels do not vary substantially. In the example of FIGS. 2, 3 and 4, the signal levels of the pixels 20 do not vary as Z increases in the zone 13, and the first order vertical derivatives 22 are substantially null.

For example, above the surface 11, in a zone 12, the penetrating radiation 40 is transmitted through air only, and the signal levels do not vary substantially. In the example of FIGS. 2, 3 and 4, the signal levels of the pixels 20 do not vary as Z increases in the zone 12, and the first order vertical derivatives 22 are substantially null.

As illustrated in FIGS. 2 and 4, the first order horizontal derivatives 24 which are smaller than the predetermined threshold (as illustrated by the small triangles in FIG. 4)—e.g. substantially null—are associated with a horizontal surface 11 of the liquid cargo 10. In the zone 1, the first order horizontal derivatives 24 are close to zero or substantially null, regardless of the direction on the (OX) axis of FIGS. 2 and 4. In other words, the absolute value of the first order horizontal derivatives 24 is smaller than the predetermined threshold.

As illustrated in FIGS. 2 and 5, the surface 9 is not horizontal (e.g. not substantially parallel to the direction (OX)) and the first order horizontal derivatives 24 corresponding to the solid cargo 90 are not close to zero or substantially null, as illustrated by the horizontal arrows in FIG. 5. In other words, the absolute value of the first order horizontal derivatives 24 corresponding to the surface 9 are not smaller than the predetermined threshold.

As already stated, the zone 1 corresponding to the surface 11 of the liquid cargo 10 may be detected, at S5, based at least on the zones where the first order vertical derivative 22 is positive, and the absolute value of the first order horizontal derivative 24 is smaller than the predetermined threshold, as determined at S4.

Referring back to FIG. 1, the method 100 may include the optional step S45 between S4 and S5. The optional step S45 adds criteria to be met by the zones determined at S4 and may enhance resilience of the method 100 to false positives for detection of liquid surfaces. The optional step S45 is disclosed in more detail below.

As illustrated in FIG. 6, S45 may include:

for each zone 1 determined at S4, determining, at S451, an upper second order vertical derivative 26 of the signal levels (illustrated in FIG. 4), in each pixel 20 of at least an upper border zone 25 (illustrated in FIG. 4), the upper border zone 25 straddling an upper border 27 of the determined zone 1, the upper second order vertical derivative 26 being determined from a lower vertical location in the upper border zone 25 to an upper vertical location in the upper border zone 25 (e.g. increasing Z along on the axis (OZ) in FIG. 4); and determining, at S452, in the zones determined at S451, first selected determined zones where the determined upper second order vertical derivative 26 has a negative peak at the upper border 27 (as illustrated by the downwards double vertical arrows in FIG. 4).

As already explained above, in the zone 1, the first order vertical derivatives 22 are positive (as illustrated by the upwards single arrows in FIG. 4). Top first order vertical derivatives 22 above the upper border zone 25 (e.g. in the zone 12 of FIGS. 3 and 4) are substantially null and are associated with an amount of liquid crossed by the inspection radiation 40 being constantly substantially null above the surface 11 of the liquid cargo 10.

In the example of FIG. 4, in the upper border zone 25 the first order vertical derivatives 22 decrease as Z increases, and the second order vertical derivatives 26 have a negative peak at the upper border 27 (as illustrated by the downwards double vertical arrows in FIG. 4).

The upper border zone 25 may correspond to a part only of the zone 8, but in some examples the upper border zone 25 may correspond to the whole of the zone 8.

Detecting at S5 the zones 1 corresponding to the surface 11 of the liquid cargo 10 may further be based on the first selected determined zones determined at S452. The first selected determined zones meet additional criteria compared to the zones determined at S4 and may enhance resilience of the method 100 to false positives for detection of liquid surfaces.

As illustrated in FIG. 6, S45 may further include:

for each determined zone, determining at S453 a first order horizontal derivative 28 of the upper second order vertical derivative 26 in each pixel 20 in the first selected zones determined at S452;

determining at S454, in the first selected determined zones, third selected determined zones where the determined first order horizontal derivative 28 of the upper second order vertical derivative 26 is substantially null (as illustrated by the equal sign 28 in FIG. 4).

As illustrated in FIG. 4, first order horizontal derivatives 28 of the upper second order vertical derivative 26 which are substantially null are associated with a horizontal surface 11 of the liquid cargo 10.

Detecting at S5 the zones 1 corresponding to the surface 11 of the liquid cargo 10 may further be based on the third selected determined zones determined at S454. The third selected determined zones meet additional criteria compared to the zones determined at S4 and may enhance resilience of the method 100 to false positives for detection of liquid surfaces.

Referring back to FIG. 6, alternatively or additionally, S45 may include:

for each zone 1 determined at S4, determining, at S451, a lower second order vertical derivative 36 of the signal levels (illustrated in FIG. 4), in each pixel 20 of at least a lower border zone 35 (illustrated in FIG. 4), the lower border zone 35 straddling a lower border 37 of the determined zone 1, the lower second order vertical derivative 36 being determined from a lower vertical location in the lower border zone 35 to an upper vertical location in the lower border zone 35 (e.g. increasing Z along on the axis (OZ) in FIG. 4); and determining, at S452, in the zones determined at S451, second selected determined zones where the determined lower second order vertical derivative 36 has a positive peak at the lower border 37.

As already explained above, bottom first order vertical derivatives 22 below the lower border zone 35 (e.g. in the zone 13 of FIGS. 3 and 4) are substantially null or slightly positive and are associated with an amount of liquid 10 crossed by the inspection radiation not or slightly increasing from a lower location to an upper location (e.g. increasing Z along on the axis (OZ) in FIG. 4), below the surface 11 of the liquid cargo 10. As also already explained above, in the zone 1, the first order vertical derivatives 22 are positive (as illustrated by the upwards single arrows in FIG. 4).

In the example of FIG. 4, in the lower border zone 35 the first order vertical derivatives 22 increase as Z increases, and the second order vertical derivatives 36 have a positive peak at the lower border 37 (as illustrated by the upwards double vertical arrows in FIG. 4).

The lower border zone 35 may correspond to a part only of the zone 8, but in some examples the lower border zone 35 may correspond to the whole of the zone 8.

Detecting at S5 the zones 1 corresponding to the surface 11 of the liquid cargo 10 may further be based on the second selected determined zones determined at S452. The second selected determined zones meet additional criteria compared to the zones determined at S4 and may enhance resilience of the method 100 to false positives for detection of liquid surfaces.

As illustrated in FIG. 6, S45 may further include:

for each determined zone, determining at S453 a first order horizontal derivative 38 of the lower second order vertical derivative 36 in each pixel 20 in the second selected zones determined at S452; and determining, in the second selected determined zones, fourth selected determined zones where the first order horizontal derivative 38 of the lower second order vertical derivative 36 is substantially null (as illustrated by the equal sign 38 in FIG. 4).

As illustrated in FIG. 4, first order horizontal derivatives 38 of the lower second order vertical derivatives 36 which are substantially null are associated with a horizontal surface 11 of the liquid cargo 10.

Detecting at S5 the zones 1 corresponding to the surface 11 of the liquid cargo 10 may further be based on the fourth selected determined zones determined at S454. The fourth selected determined zones meet additional criteria compared to the zones determined at S4 and may enhance resilience of the method 100 to false positives for detection of liquid surfaces.

Figure 7:
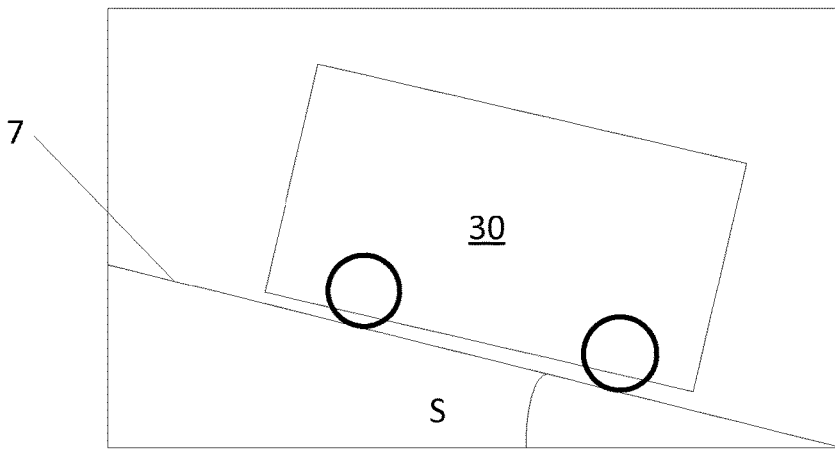

In some examples, tilting the cargo around the first horizontal direction may include:

tilting the cargo 30 in a first tilting orientation (e.g. as illustrated in FIG. 2); and tilting the cargo in a second tilting orientation, the second tilting orientation being opposite to the first orientation (e.g. as illustrated in FIG. 7).

The inspection of the cargo may thus include:

tilting the cargo in the first tilting orientation and scanning the cargo tilted in the first tilting orientation (e.g. as illustrated in FIG. 2); and tilting the cargo in a second tilting orientation, the second tilting orientation being opposite to the first orientation, and scanning the cargo tilted in the second tilting orientation (e.g. as illustrated in FIG. 7).

In both tilted orientations, the liquid surfaces will be horizontal in the corresponding inspection images, and the liquid surfaces can be detected in the corresponding inspection images, by comparing the two images. Detecting the zones corresponding to the surface of liquid cargo may thus include comparing the specific zones determined at S4 for each tilting orientation.

The second tilted orientation and scan add criteria to be met by the surfaces in the cargo and may enhance resilience of the method 100 to false positives for detection of liquid surfaces.

In some examples the tilting of the cargo around the first horizontal direction is with a slope S with respect to a horizontal direction such that:

$$2° \leq S \leq 25°.$$

Figure 8:
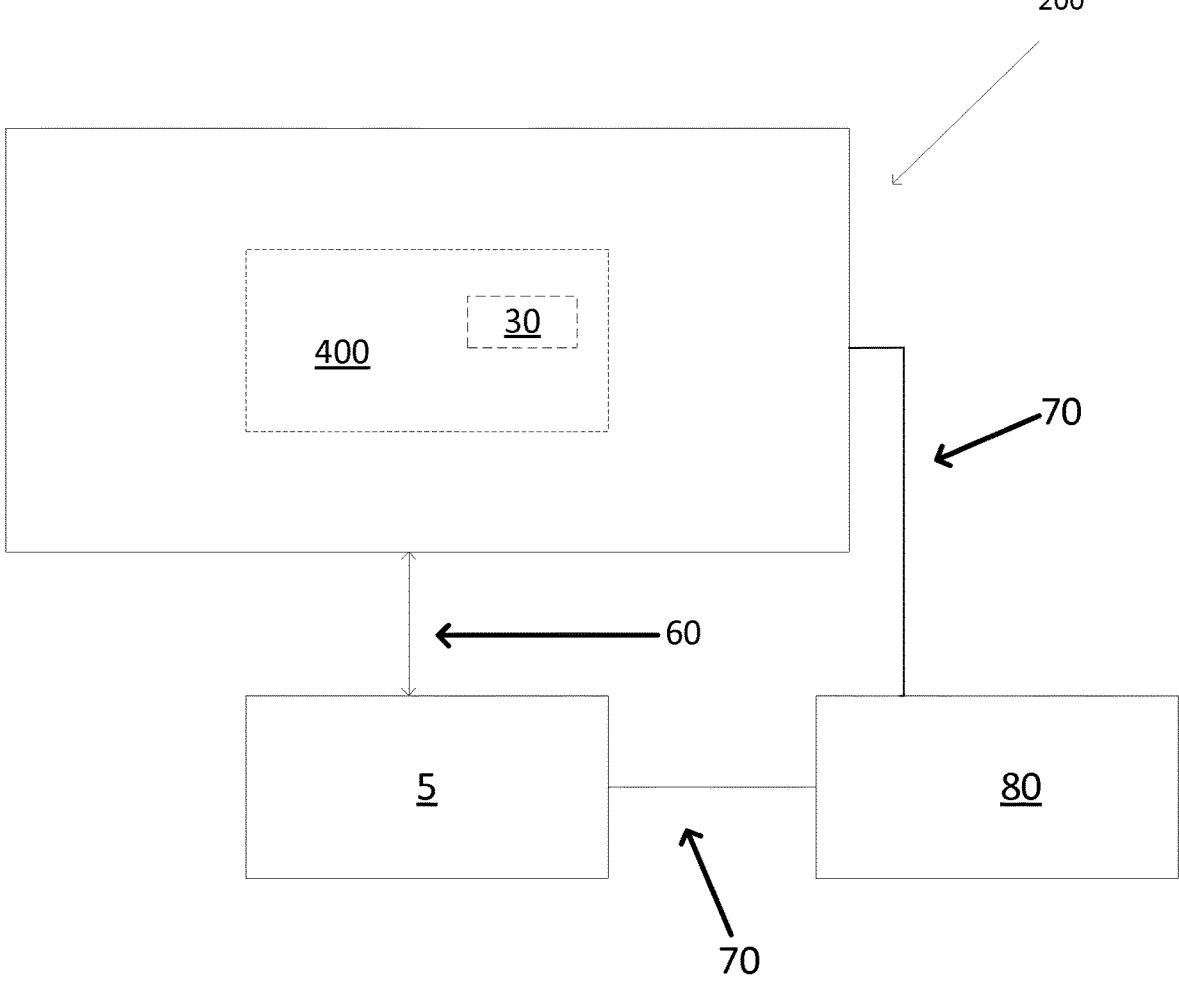
FIG. 8 schematically illustrates an apparatus configured to perform, at least partly, a method according to any aspects of the disclosure.

FIG. 8 schematically illustrates an apparatus 5 configured to perform, at least partly, a method 100 according to any aspects of the disclosure. The apparatus 5 is configured to cooperate with an inspection system 200 of any aspects of the disclosure.

The apparatus 5 may include:

a processor; and a memory storing instructions which, when executed by the processor, enable the apparatus to perform the method of any aspects of the disclosure.

In FIG. 8 the cargo 30 to be inspected is located in a container 400. The inspection system 200 of FIG. 8 may be configured to generate the inspection data according to any aspects of the disclosure.

The apparatus 5 may be configured to receive the inspection data, for example over a communication network 60 which may be wired and/or may be wireless.

In the example illustrated by FIG. 8, a communication server 80 may be configured to communicate, via a communication network 70 which may be wired and/or may be wireless, with the system 200 and/or the apparatus 5. In some examples, the communication server 80 may be configured to perform functions of a remote data management system. In some examples the server 80 may include a database. The database may be configured to store the inspection data of any aspects of the disclosure.

Similarly the apparatus 5 may be configured to store the inspection data of any aspects of the disclosure.

Variations and Modifications

It is understood that the inspection radiation source may include sources of other radiation, such as, as non-limiting examples, sources of ionizing radiation, for example gamma rays or neutrons.

As one possibility, there is provided a computer program, computer program product, or computer readable medium, including computer program instructions to cause a programmable computer to carry out any one or more of the methods described herein. In example implementations, at least some portions of the activities related to the apparatus 5 herein may be implemented in software. It is appreciated that software components of the present disclosure may, if desired, be implemented in ROM (read only memory) form. The software components may, generally, be implemented in hardware, if desired, using conventional techniques.

In some examples, components of the apparatus 5 and/or the communications networks 60 and/or 70 may use specialized applications and hardware.

As will be apparent to the skilled in the art, the server 80 and/or the apparatus 5 should not be understood as a single entity, but rather refers to a physical and/or virtual device including at least a processor and a memory, the memory may be included in one or more servers which can be located in a single location or can be remote from each other to form a distributed network (such as "server farms", e.g., using wired or wireless technology).

In some examples, one or more memory elements (e.g., the database and/or the memory of the processor) can store data used for the operations described herein. This includes the memory element being able to store software, logic, code, or processor instructions that are executed to carry out the activities described in the disclosure.

A processor can execute any type of instructions associated with the data to achieve the operations detailed herein in the disclosure. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

The communications network 60 and the communications network 70 may form only one network.

The data received by the apparatus 5 may be typically received over a range of possible communications networks 60 and/or 70 at least such as: a satellite based communications network; a cable based communications network; a telephony based communications network; a mobile-telephony based communications network; an Internet Protocol (IP) communications network; and/or a computer based communications network.

In some examples, the communications networks 60 and/or 70 and/or the apparatus 5 may include one or more networks. Networks may be provisioned in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network.

The inspection system 200 may be mobile and may be transported from a location to another location (the system may include an automotive vehicle). Alternatively or additionally, the inspection system may be static with respect to the ground and cannot be displaced.

The inspection radiation source may include an X-ray generator. The energy of the X-rays may be between 100 keV and 15 MeV, and the dose may be between 2 mGy and 20 Gy (Gray). For a mobile inspection system, the power of the X-ray source may be e.g., between 100 keV and 9.0 MeV, typically e.g., 2 MeV, 3.5 MeV, 4 MeV, or 6 MeV, for a steel penetration capacity e.g., between 40 mm to 400 mm, typically e.g., 300 mm (12 in). For a mobile inspection system, the dose may be e.g., between 20 mGy and 120 mGy. For a static inspection system, the power of the X-ray source may be e.g., between 4 MeV and 10 MeV, typically e.g., 9 MeV, for a steel penetration capacity e.g., between 300 mm to 450 mm, typically e.g., 410 mm (16.1 in). For a static inspection system, the dose may be 17 Gy.

The detectors may include, amongst other conventional electrical elements, radiation detection lines, such as X-ray detection lines. The detectors may further include other types of detectors, such as optional gamma and/or neutrons detectors, e.g., adapted to detect the presence of radioactive gamma and/or neutrons emitting materials within the container, e.g., simultaneously to the X-ray inspection. For a mobile inspection system, the detectors may also include an electro-hydraulic boom which can operate in a retracted position in a transport mode and in an inspection position. The boom may be operated by hydraulic activators (such as hydraulic cylinders). For a static inspection system, the detectors may also include a structure and/or gantry. The detection lines may be mounted on the boom or structure and/or gantry, facing the source on the other side of the container.

In order to inspect the container, the system may include a motion generation device so that the system may be displaced, the container being static (this mode is sometimes referred to as a 'scanning' mode). Alternatively or additionally, the motion generation device may cause the container to be displaced, the system being static with respect to the ground. In some embodiments, the throughput, i.e. the number of containers and/or images by unit of time, may be of 20 to 30 images/hour. Alternatively or additionally, in a 'pass-through' mode the system does not include a motion generation device and the container moves with respect to the system, the system being static with respect to the ground. In embodiments, the throughput in the pass-through mode may be higher than the throughput in the scanning mode, and may be for example of 50 to 200 images/hour, or even of 50 to a few thousands images/hour in the case of an inspection of a passing train (for example a throughput of more than 1000 images/hour).

The above embodiments are to be understood as illustrative examples, and further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

The invention claimed is:

1. A method for detecting zones corresponding to a surface of liquid cargo in an inspection image of inspected cargo, the method comprising:

obtaining inspection data associated with pixels of zones of interest in the inspection image generated from inspection of the cargo using penetrating radiation transmitted through the cargo, the pixels having signal levels and wherein the inspection of the cargo comprises:

tilting the cargo around a first horizontal direction perpendicular to a vertical direction corresponding to a direction of gravity; and scanning the tilted cargo in a second horizontal direction perpendicular to the first horizontal direction;

determining a vertical derivative field from the obtained inspection data by:

determining a first order vertical derivative of the signal levels in each pixel of the zones of interest, from a lower vertical location in the zones of interest to an upper vertical location in the zones of interest;

determining a horizontal derivative field from the obtained inspection data by:

determining a first order horizontal derivative of the signal levels in each pixel of the zones of interest; and determining, based on the determined vertical derivative field and on the determined horizontal derivative field, zones where:

the first order vertical derivative is positive; and the absolute value of the first order horizontal derivative is smaller than a predetermined threshold, wherein the first order vertical derivative which is positive is associated with an amount of liquid crossed by the inspection radiation decreasing from the lower vertical location to the upper vertical location, in the detected zone, at the surface of the liquid cargo; and for each determined zone, determining an upper second order vertical derivative of the signal levels, in each pixel of at least an upper border zone, the upper border zone straddling an upper border of the determined zone, the upper second order vertical derivative being determined from a lower vertical location in the upper border zone to an upper vertical location in the upper border zone;

determining, in the determined zones, first selected determined zones where the determined upper second order vertical derivative has a negative peak at the upper border, and detecting zones corresponding to a surface of liquid cargo based at least on the determined zones, wherein detecting the zones corresponding to the surface of the liquid cargo is further based on the first selected determined zones.

2. The method of claim 1, wherein a top first order vertical derivative above the upper border zone is substantially null and is associated with an amount of liquid crossed by the inspection radiation being constantly substantially null above the surface of the liquid cargo.

3. The method of claim 1, further comprising:

for each determined zone, determining a lower second order vertical derivative of the signal levels, in each pixel of at least a lower border zone, the lower border zone straddling a lower border of the determined zone, the lower second order vertical derivative being determined from a lower vertical location in the lower border zone to an upper vertical location in the lower border zone; and determining, in the determined zones, second selected determined zones where the determined lower second order vertical derivative has a positive peak at the lower border, and wherein detecting the zones corresponding to the surface of the liquid cargo is further based on the second selected determined zones.

4. The method of claim 3, wherein a bottom first order vertical derivative is substantially null or slightly positive and is associated with an amount of liquid crossed by the inspection radiation not or slightly increasing from a lower location to an upper location, below the surface of the liquid cargo.

5. The method of claim 3, further comprising:

for each determined zone, determining a first order horizontal derivative of the lower second order vertical derivative in each pixel in the second selected zones; and determining, in the second selected determined zones, fourth selected determined zones where the first order horizontal derivative of the lower second order vertical derivative is substantially null, and wherein detecting the zones corresponding to the surface of the liquid cargo further based on the fourth selected determined zones.

6. The method of claim 5, wherein the first order horizontal derivative of the lower second order vertical derivative which is substantially null is associated with a horizontal surface of the liquid cargo.

7. The method of claim 1, wherein the first order horizontal derivative which is smaller than the predetermined threshold is associated with a horizontal surface of the liquid cargo.

8. The method of claim 1, further comprising:

for each determined zone, determining a first order horizontal derivative of the upper second order vertical derivative in each pixel in the first selected zones; and determining, in the first selected determined zones, third selected determined zones where the determined first order horizontal derivative of the upper second order vertical derivative is substantially null, and wherein detecting the zones corresponding to the surface of the liquid cargo is further based on the third selected determined zones.

9. The method of claim 8, wherein the first order horizontal derivative of the upper second order vertical derivative which is substantially null is associated with a horizontal surface of the liquid cargo.

10. The method of claim 1, wherein the inspection of the cargo comprises:

tilting the cargo in a first tilting orientation, and scanning the cargo tilted in the first tilting orientation; and tilting the cargo in a second tilting orientation, the second tilting orientation being opposite to the first orientation, and scanning the cargo tilted in the second tilting orientation, and wherein detecting the zones corresponding to the surface of liquid cargo comprises comparing the zones determined for each tilting orientation.

11. The method of claim 1, wherein the tilting of the cargo around the first horizontal direction is with a slope S with respect to a horizontal direction such that:

$$2° \leq S \leq 25°.$$

12. The method of claim 1, wherein the first order vertical derivative which is positive is greater than a predetermined threshold.

13. An apparatus comprising:

a processor; and a memory storing instructions which, when executed by the processor, enable the apparatus to perform the method of claim 1.

*     *     *     *     *